(12) United States Patent
Boozer et al.

(10) Patent No.: US 8,430,557 B2
(45) Date of Patent: Apr. 30, 2013

(54) SPOON FOOD MIXER

(75) Inventors: Richard D. Boozer, Wakeman, OH (US); Robert M. Ulanski, Broadview Heights, OH (US)

(73) Assignee: Vita-Mix Corporation, Cleveland, OH (US)

( * ) Notice: Subject to any disclaimer, the term of this patent is extended or adjusted under 35 U.S.C. 154(b) by 1481 days.

(21) Appl. No.: 11/717,015

(22) Filed: Mar. 13, 2007

(65) Prior Publication Data

US 2008/0223225 A1 Sep. 18, 2008

(51) Int. Cl.
*A47J 43/044* (2006.01)
(52) U.S. Cl.
USPC ............................. 366/197; 366/331; 366/343
(58) Field of Classification Search ............ 24/625, 24/627, 615–616; 279/19.4, 23.1, 24, 28, 279/29, 89, 93, 105; 366/197, 331, 343; 403/178, 227, 329; 464/51, 84, 901
See application file for complete search history.

(56) References Cited

U.S. PATENT DOCUMENTS

| | | | | |
|---|---|---|---|---|
| 414,566 A * | 11/1889 | Nelleson | ................. | 366/197 |
| 1,156,267 A * | 10/1915 | Blank | ................. | 24/616 |
| 1,264,072 A * | 4/1918 | Holden | ................. | 24/616 |
| 1,625,266 A * | 4/1927 | Mast | ................. | 403/184 |
| 1,630,627 A * | 5/1927 | Miller | ................. | 164/245 |
| 1,804,959 A * | 5/1931 | Stuart | ................. | 279/93 |
| 1,898,946 A * | 2/1933 | Fitzgerald | ................. | 248/125.1 |
| 2,138,253 A * | 11/1938 | Lynch | ................. | 279/29 |
| 2,299,972 A * | 10/1942 | Gallen et al. | ................. | 279/29 |
| 2,343,364 A * | 3/1944 | Bochenek | ................. | 279/50 |
| 2,449,578 A * | 9/1948 | Barr | ................. | 366/247 |
| 2,485,303 A * | 10/1949 | Marcus | ................. | 366/247 |
| 2,559,196 A * | 7/1951 | Medved | ................. | 99/422 |
| 2,621,906 A * | 12/1952 | Van Guilder | ................. | 416/221 |
| 2,833,576 A * | 5/1958 | Cirone | ................. | 403/334 |
| 3,181,189 A * | 5/1965 | Leyden | ................. | 15/22.1 |
| 3,369,265 A * | 2/1968 | Halberstadt et al. | ............ | 15/22.1 |
| 3,417,972 A * | 12/1968 | Conway | ................. | 241/199.12 |
| 3,812,556 A * | 5/1974 | Colombo | ................. | 24/653 |
| 4,207,673 A * | 6/1980 | DiGirolamo et al. | .......... | 30/142 |
| 4,708,487 A * | 11/1987 | Marshall | ................. | 366/206 |
| 4,712,280 A * | 12/1987 | Fildan | ................. | 24/625 |
| 4,806,140 A * | 2/1989 | Krug et al. | ................. | 65/290 |
| D309,399 S | 7/1990 | Barnard et al. | | |
| 4,946,287 A | 8/1990 | Barnard et al. | | |
| 4,991,272 A * | 2/1991 | Bianchi | ................. | 24/616 |
| 5,112,135 A * | 5/1992 | Rupp | ................. | 366/197 |
| 5,131,151 A * | 7/1992 | Agase et al. | ................. | 30/327 |
| 5,207,754 A * | 5/1993 | Harrah | ................. | 15/147.1 |
| 5,375,286 A * | 12/1994 | Harrah | ................. | 15/147.1 |
| 5,465,472 A * | 11/1995 | Matoba | ................. | 24/625 |
| 5,499,984 A * | 3/1996 | Steiner et al. | ................. | 606/80 |
| 5,597,275 A * | 1/1997 | Hogan | ................. | 408/239 R |

(Continued)

*Primary Examiner* — David Sorkin
(74) *Attorney, Agent, or Firm* — Renner, Kenner, Greive, Bobak, Taylor & Weber

(57) ABSTRACT

A food mixer (10) includes a rotatable shaft (18) which carries a coupler (21) having an aperture (25) therein. An agitator (22) is configured as a spoon having a bowl (27) and a stem (26). The stem (26) is received in the aperture (25) and in one embodiment a flexible tab (32) at the end of the stem (26) is engaged by a lug (37) in the aperture (25) to attach the agitator (22) to the coupler (21). In another embodiment, flexible tines (52) have lugs (53) which are received in a bore (46) in a coupler (41) to attach the agitator (42) to the coupler (41).

10 Claims, 3 Drawing Sheets

U.S. PATENT DOCUMENTS

| | | | | |
|---|---|---|---|---|
| 5,720,749 | A * | 2/1998 | Rupp | 606/79 |
| 5,956,851 | A * | 9/1999 | Apprille et al. | 30/47 |
| 6,029,308 | A * | 2/2000 | Smith | 15/229.2 |
| 6,052,875 | A * | 4/2000 | Fudaki | 24/625 |
| D424,874 | S * | 5/2000 | Anton et al. | D7/412 |
| D426,108 | S * | 6/2000 | Anton et al. | D7/412 |
| 6,086,240 | A * | 7/2000 | Murphy | 366/147 |
| 6,106,539 | A * | 8/2000 | Fortier | 606/185 |
| 6,148,486 | A * | 11/2000 | Uehara et al. | 24/170 |
| 6,244,778 | B1 * | 6/2001 | Chesbrough | 403/51 |
| 6,264,358 | B1 * | 7/2001 | Eisaman et al. | 366/203 |
| 6,264,360 | B1 * | 7/2001 | Lehmusvaara et al. | 366/331 |
| 6,357,974 | B1 * | 3/2002 | Robins | 408/240 |
| 6,487,748 | B1 * | 12/2002 | Dardar et al. | 15/167.1 |
| 6,619,833 | B1 * | 9/2003 | Skudelny | 366/129 |
| 6,622,355 | B2 * | 9/2003 | Buscart et al. | 24/615 |
| 6,789,933 | B2 * | 9/2004 | Gili et al. | 366/129 |
| 6,824,180 | B2 * | 11/2004 | Tomchak | 294/57 |
| 6,908,222 | B2 * | 6/2005 | Brunswick et al. | 366/331 |
| 6,921,227 | B1 * | 7/2005 | De Jong et al. | 403/329 |
| 7,219,406 | B2 * | 5/2007 | Chui | 24/625 |
| 7,296,926 | B2 * | 11/2007 | Schnipke et al. | 366/331 |
| 7,645,066 | B2 * | 1/2010 | Tague et al. | 366/245 |
| 7,725,993 | B1 * | 6/2010 | Giampavolo | 24/615 |
| 7,857,592 | B2 * | 12/2010 | Bucher et al. | 416/210 R |
| 2002/0094232 | A1 * | 7/2002 | Lipp et al. | 403/329 |
| 2003/0174576 | A1 * | 9/2003 | Tague et al. | 366/139 |
| 2005/0210640 | A1 * | 9/2005 | Giampavolo | 24/615 |
| 2005/0210641 | A1 * | 9/2005 | Giampavolo | 24/615 |
| 2007/0204441 | A1 * | 9/2007 | Saitsu | 24/614 |
| 2008/0159070 | A1 * | 7/2008 | Cocchi et al. | 366/343 |
| 2010/0157725 | A1 * | 6/2010 | Terentiev et al. | 366/331 |

* cited by examiner

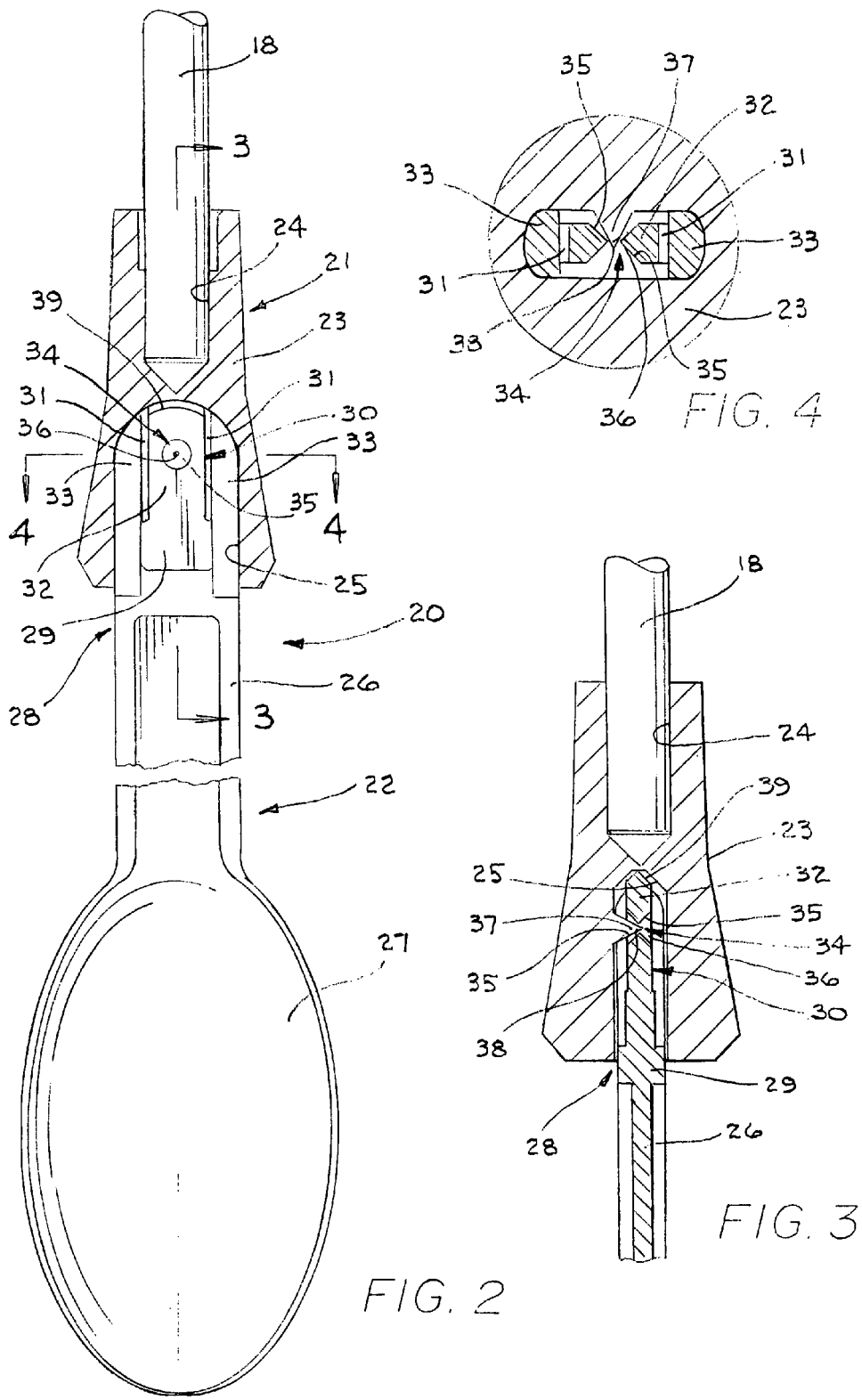

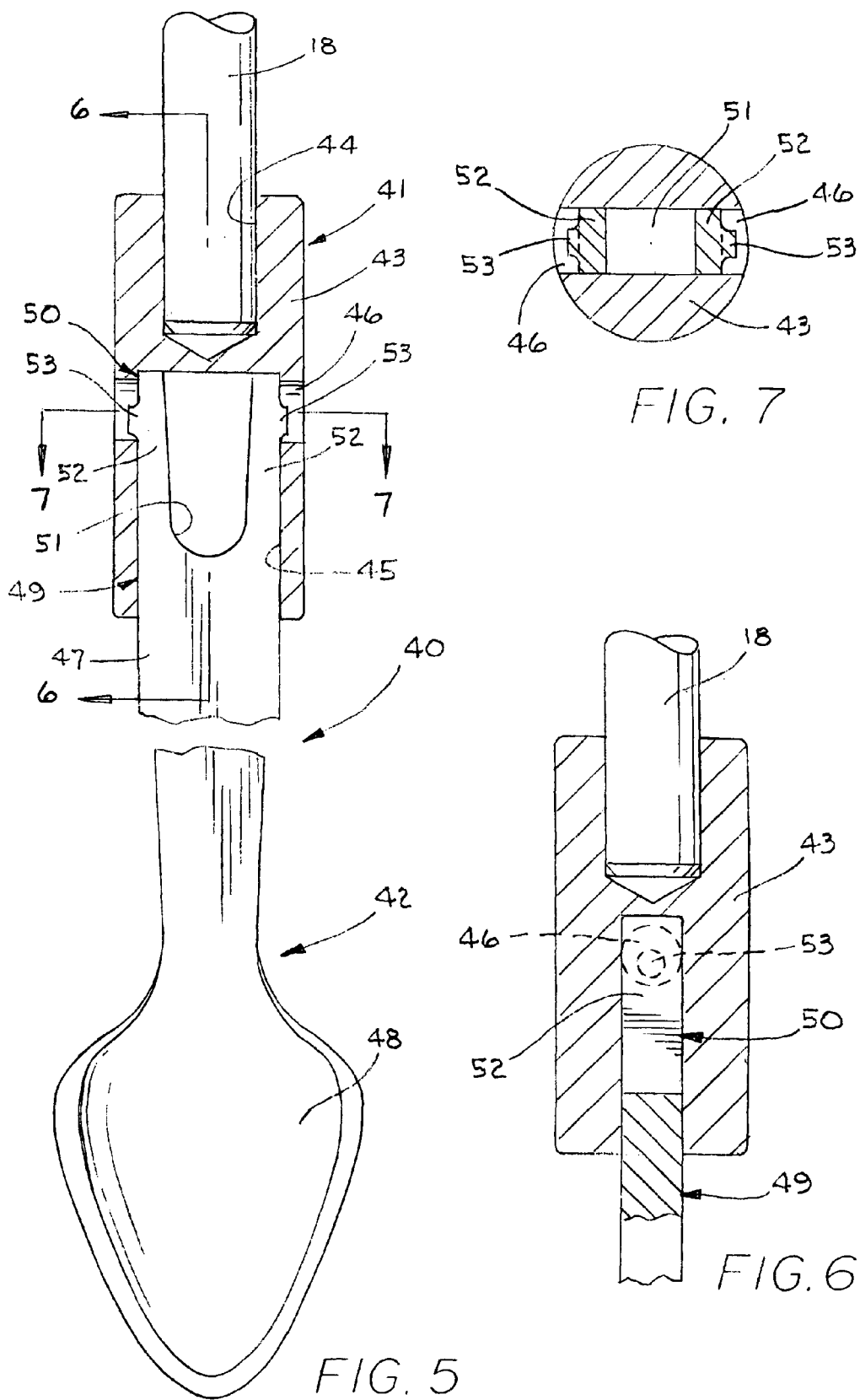

SPOON FOOD MIXER

TECHNICAL FIELD

This invention relates to an agitator for a food mixer which is in the configuration of a spoon. More particularly, this invention relates to the manner in which the spoon agitator is quickly and conveniently attached to the rotatable shaft of the food mixer.

BACKGROUND ART

Food mixing machines are commonly utilized by fast food establishments or the like, particularly those that blend condiments or other foods into ice cream in the cup for consumption by the customer with a spoon. The blending is typically performed by an agitator carried at the bottom of a rotating shaft. The ice cream and other foods to be blended are put into a cup and the agitator is positioned in the ice cream to blend the product. After use, the agitator must be cleaned to avoid contamination of the next product to be blended.

To improve such traditional activity, a disposable plastic agitator was developed which was in the shape of a spoon. In that device, the bowl of the spoon mixes the product and the handle of the spoon is hollow and is received over the rotatable shaft of the food mixer. The spoon shaft is provided with a clip which could be snapped over a rib provided on the rotatable shaft to attach the spoon to the shaft. The product is then blended and the spoon removed from the shaft. This system is advantageous not only because the rotatable shaft is protected from contamination, thereby saving the time of having to clean the shaft after each use, but also the spoon can be given to the user to consume the food thereby saving the establishment the cost of providing conventional spoons to the customer. However, these spoons with the hollow handle and the clip are quite expensive to manufacture. Moreover, the threading of the shaft into the handle while at the same time manipulating the clip to attach the spoon to the shaft is not easily accomplished in the time conscious environment of the fast food establishment.

There have been other attempts to maintain the advantage of the spoon shape while endeavoring to save costs of manufacture and time of use. In these situations, a food mixer is provided with a shorter rotatable shaft and an adapter is attached to the bottom of the shaft. The adapter is provided with an aperture to receive the handle of a spoon-shaped agitator. After the handle is positioned within the adapter, a cylindrical collar can be slid along the outside of the adapter to cause plungers to engage the spoon handle. While such a system can utilize spoons which are less expensive to manufacture, the adapter is not only complex and costly to manufacture, but also it is difficult to use. Specifically, the user must, with one hand, position the spoon shaft in the adapter and then, at the same time, with the other hand, slide the collar along the outside of the agitator to attach the spoon to the rotatable shaft. In a similar system, the plungers may be spring biased toward the spoon handle and held in place by the collar. But this system too is complex and costly. Moreover, these adapters and their movable parts must often be cleaned to prevent contamination and cleaning such adapters with their movable parts is problematic, at best.

The need exists, therefore, for a system which is inexpensive to manufacture and easy to use without contamination problems so that food products can be conveniently mixed while maintaining the advantage of providing the agitator in the configuration of a spoon to be used by the customer to consume the food.

DISCLOSURE OF THE INVENTION

It is thus an object of the present invention to provide a food mixer with an agitator in the shape of a spoon which can easily be attached to the rotatable shaft of the food mixer.

It is another object of the present invention to provide a food mixer, as above, with a coupler which can be attached to the rotatable shaft and which can conveniently receive an hold the handle of the spoon agitator.

It is an additional object of the present invention to provide a food mixer, as above, which is inexpensive to manufacture and in which the coupler is easily cleanable.

It is an additional object of the present invention to provide a food mixer, as above, which is inexpensive to manufacture and in which the coupler is easily cleanable.

These and other objects of the present invention, as well as the advantages thereof over existing prior art forms, which will become apparent from the description to follow, are accomplished by the improvements hereinafter described and claimed.

In general, an agitator made in accordance with the present invention is adapted to be attached to a coupler which is carried by a rotatable shaft of a food mixer. The agitator includes a stem having a portion which flexes to attach the stem to the coupler.

An agitator assembly made in accordance with the present invention is adapted to be attached to a rotatable shaft of a food mixer and includes a coupler adapted to be attached to the shaft. The coupler has an aperture therein. An agitator includes a stem, one end of which has a flexible portion. That end of the stem is received in the aperture and flexes to attach the stem to the coupler.

A food mixer made in accordance with the present invention includes a rotatable shaft and a coupler attached to the shaft. The coupler is provided with an aperture. An agitator includes a stem. One end of the stem is provided with a flexible portion. That end is received in the aperture of the coupler and flexes to attach the agitator to the coupler.

A preferred exemplary food mixer with a shaft coupler and spoon agitator according to the concepts of the present invention is shown by way of example in the accompanying drawings without attempting to show all the various forms and modifications in which the invention might be embodied, the invention being measured by the appended claims and not by the details of the specification.

BRIEF DESCRIPTION OF THE DRAWINGS

FIG. 2 is a fragmented elevational view of a spoon agitator shown in conjunction with a sectioned shaft coupler made in accordance with one embodiment of the present invention.

FIG. 3 is a sectional view taken substantially along line 3-3 of FIG. 2 FIG. 4 is a sectional view taken substantially along line 4-4 of FIG. 2.

FIG. 5 is a fragmented elevational view of a spoon agitator shown in conjunction with a sectioned shaft coupler made in accordance with another embodiment of the present invention.

FIG. 6 is a sectional view taken substantially along line 6-6 of FIG. 5.

FIG. 7 is a sectional view taken substantially along line 7-7 of FIG. 5.

PREFERRED EMBODIMENTS FOR CARRYING OUT THE INVENTION

Figure 1:
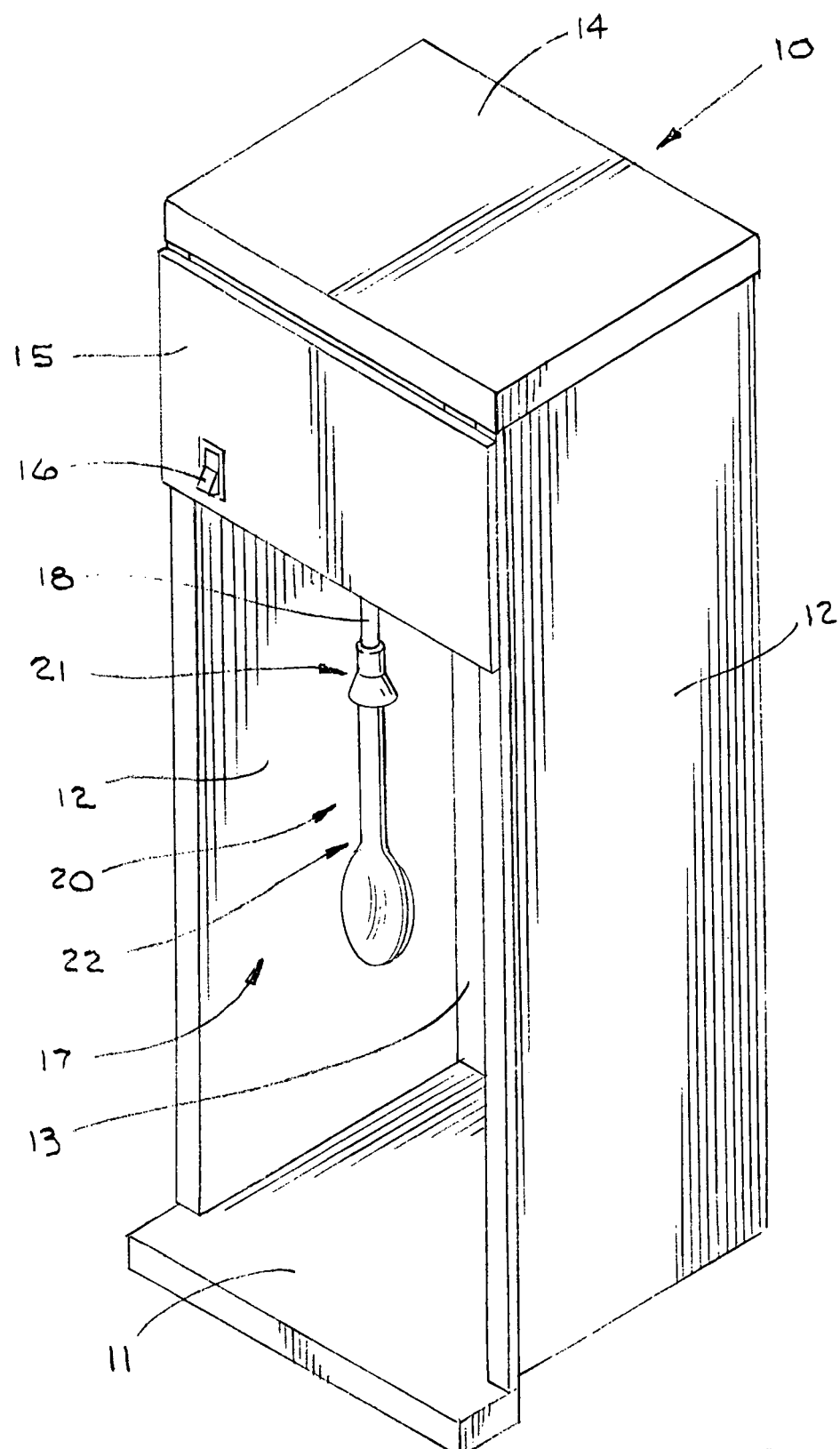
FIG. 1 is a somewhat schematic perspective representation of a food mixing machine having a spoon agitator and a shaft coupler made in accordance with the present invention.

A food mixing machine is somewhat schematically shown in FIG. 1 and is generally indicated by the numeral 10. Food mixing machine 10 includes a base 11, opposed side walls 12 extending upwardly from base 11, and a rear wall 13 extending upwardly from base 11 between side walls 12. A cover plate 14 is positioned on top of walls 12 and 13, and a face plate 15 extends between side walls 12 near the top thereof. Face plate 15 carries a power switch 16 which may be utilized to selectively activate or deactivate a motor (not shown) which is housed between cover plate 14, face plate 15, and walls 12 and 13. It should be appreciated that means other than switch 16 may be utilized to activate the motor. The front of machine 10, below face plate 15, is open to form a compartment 17. A motor shaft 18 extends downwardly from the motor and into compartment 17. Shaft 18 carries an agitator assembly, one embodiment thereof being generally indicated by the numeral 20, and upon activation of the motor, shaft 18 will rotate to allow agitator assembly 20 to blend food in a cup as now will be described.

Agitator assembly 20 is shown in FIGS. 2-4 and includes a coupler generally indicated by the numeral 21 and an agitator generally indicated by the numeral 22. Coupler 21 is preferably formed of a metallic material, such as stainless steel, and includes a generally cylindrical body portion 23 having a first aperture 24 at one end and a second aperture 25 at the opposed end. Aperture 24 is adapted to receive the bottom of motor shaft 18 which is connected to coupler 21 by any suitable means such as set screws or the like (not shown). Shaft 18 thus carries coupler 21 for rotation therewith.

Agitator 22 is formed of any suitable plastic material such as Acrylontrile-Butadiene-Styrene (ABS), and is configured in the shape of a spoon. As such, it includes a handle or stem 26 having the spoon bowl 27 formed at one end thereof. The other end of stem 26 includes a portion generally indicated by the numeral 28 which is received in aperture 25 of coupler 21.

The end portion 28 of spoon agitator 22 is shown as being a flat member having a base portion 29 which, as shown in FIGS. 2 and 3, is the approximate size of the diameter coupler aperture 25. A flexible portion, generally indicated by the numeral 30, of spoon stem end 28, is formed by providing slots 31 extending longitudinally along stem end 28. The end portion 30 is thus configured as a central flexible tab 32 spaced, by slots 31, from opposed outer tines 33. Tab 32 has a generally central aperture, generally indicated by the numeral 34, formed therethrough. Aperture 34 is preferably formed by a generally conical recess 35 provided on each side of tab 32. As shown in FIGS. 3 and 4, where recesses 35 meet, the opening 36 for aperture 32 is created.

The coupler 21 is provided with a lug 37 which extends into coupler aperture 25. Lug 37 is preferably pointed, as at 38. Spoon agitator 22 is easily and quickly attached to coupler 21, and therefore to motor shaft 18, by sliding the stem end 28 up into coupler aperture 25. As the tip 39 of tab 32 (which is pointed for ease of insertion as shown in FIG. 3) engages lug 37, tab 32 will flex until lug 37 is received in tab aperture 34, as shown in FIGS. 3 and 4, at which point tab 32 will snap back into its unflexed position. As such, spoon agitator 22 will now rotate with motor shaft 18 and the spoon bowl will act to mix items, such as candy, condiments, and ice cream, provided in a cup. Upon completion of the mixing, the spoon agitator 22 may be quickly removed from coupler 21 by pulling down on stem 26 which causes a conical recess 35 to easily ride over lug 37 thereby causing tab 32 to flex until it passes lug 37 such that agitator 22 can be easily removed from coupler aperture 25.

Another embodiment of an agitator assembly is shown in FIGS. 5-7 and is generally indicated by the numeral 40. Agitator assembly 40 is quite similar to assembly 20, and it includes a coupler generally indicated by the numeral 41 and an agitator generally indicated by the numeral 42. Like coupler 21, coupler 41 is preferably formed from a metallic material, such as stainless steel, and includes a generally cylindrical body portion 43 having a first aperture 44 at one end and a second aperture 45 at the opposed end. In addition, body portion 43 has a diametric bore 46 extending therethrough. Bore 46 intersects or otherwise communicates with aperture 45 as will hereinafter be described. Aperture 44 is adapted to receive the bottom of motor shaft 18 which is connected to coupler 41 by any suitable means such as set screws or the like (not shown). Shaft 18 thus carries coupler 41 for rotation therewith.

Like agitator 22, agitator 42 may be formed of any suitable plastic material such as ABS, and is configured in the shape of a spoon. As such, it includes a handle or stem 47 having the spoon bowl 48 formed at one end thereof. The exact configuration of the spoon bowl is not important to this invention and, in fact, spoon bowl 48 is shown as being differently shaped than bowl 27. The other end of stem 47 includes an end portion generally indicated by the numeral 49 which is received in aperture 45 of coupler 41.

End portion 49 of spoon agitator 42 is shown as being a flat member of approximately the size of coupler aperture 45. A flexible portion, generally indicated by the numeral 50, of spoon stem end 49 is formed by providing a U-shaped recess 51 in the top of stem end 49. As such, flexible tines 52 are formed at flexible portion 50 of stem end portion 49. A lug 53 is formed on the outer surface of each tine 52.

Spoon agitator 42 is easily and quickly attached to coupler 41, and therefore to motor shaft 18, by sliding the stem end 49 up into coupler aperture 45 which causes tines 52 to flex inwardly toward each other. Such movement will continue as lugs 53 ride along the wall of aperture 45 until lugs 53 reach bore 46 of coupler 41 at which time tines 52 will snap back with lugs 53 being received in bore 46 as shown in FIG. 5. In this position, spoon agitator 42 will now rotate with motor shaft 18 and the spoon bowl 48 will act to mix items, such as candy, condiments, and ice cream, provided in a cup. Upon completion of the mixing, the spoon agitator 42 may be quickly removed from coupler 41 by pulling down on stem 47 which causes lugs 53 to move out of bore 46 as tines 52 flex until removed from coupler 41.

In view of the forgoing, it should be evident that a food mixer provided with either agitator assembly described herein accomplishes the objects of the invention and otherwise substantially improves the art.

What is claimed is:

1. A food mixer comprising a rotatable shaft, a coupler attached to said shaft and having an aperture therein, an agitator having a stem, one end of said stem having a flexible portion, said end being received in said aperture in said coupler and being capable of being flexed to attach said agitator to said coupler, and being capable of being flexed to release said agitator from said coupler, said flexible portion having a conically shaped aperture.

2. The food mixer of claim 1 wherein the other end of said stem is shaped like the bowl of a spoon.

3. The food mixer of claim 1 wherein said coupler includes a body portion, said aperture being at one end of said body portion, and further comprising another aperture at the other end of said body portion, said another aperture receiving said shaft.

4. The food mixer of claim 1 wherein said one end of said stem includes spaced tines.

5. The food mixer of claim 4 wherein said one end includes a tab between said spaced tines, said tab forming said flexible portion.

6. The food mixer of claim 1 wherein said flexible portion includes a tab having said conically shaped aperture therein.

7. A food mixer comprising a rotatable shaft, a coupler attached to said shaft and having an aperture therein, an agitator having a stem, one end of said stem having a flexible tab having an aperture extending therethrough, said aperture in said flexible tab formed by providing mating conical recesses on each side of said tab, said tab being received in said aperture of said coupler and being flexed to attach said agitator to said coupler, said coupler having a pointed lug extending into said aperture of said coupler, said pointed lug engaging said tab to flex said tab as said stem is received in said aperture of said coupler, said pointed lug being received in said aperture of said tab when said agitator is attached to said coupler.

8. The food mixer of claim 6 wherein a base is formed at said one end of said stem, said base being generally the same size as said aperture in said coupler and carrying said tab.

9. The food mixer of claim 6 wherein said one end includes a tine on each side of said tab, there being a slot formed between said tab and each said tine.

10. The food mixer of claim 1 wherein said flexible portion includes spaced tines.

\* \* \* \* \*